(12) United States Patent
Lee et al.

(10) Patent No.: US 10,613,028 B2
(45) Date of Patent: Apr. 7, 2020

(54) OPTICAL CAVITY FOR GAS SENSOR AND GAS SENSOR HAVING OPTICAL CAVITY

(71) Applicant: ELT SENSOR Corp., Bucheon-si (KR)

(72) Inventors: Ihn Lee, Seoul (KR); Donghwan Kim, Bucheon-si (KR)

(73) Assignee: ELT SENSOR CORP., Bucheon-si (KR)

( * ) Notice: Subject to any disclaimer, the term of this patent is extended or adjusted under 35 U.S.C. 154(b) by 0 days.

(21) Appl. No.: 16/229,097

(22) Filed: Dec. 21, 2018

(65) Prior Publication Data

US 2019/0195778 A1 Jun. 27, 2019

(30) Foreign Application Priority Data

Dec. 22, 2017 (KR) .......................... 10-2017-0177899

(51) Int. Cl.
*G01N 21/61* (2006.01)
*G01N 21/01* (2006.01)
(Continued)

(52) U.S. Cl.
CPC ............. *G01N 21/61* (2013.01); *G01N 21/01* (2013.01); *G01N 21/031* (2013.01);
(Continued)

(58) Field of Classification Search
CPC ........ G01N 21/01; G01N 21/17; G01N 21/25; G01N 21/27; G01N 21/31; G01N 21/3054;
(Continued)

(56) References Cited

U.S. PATENT DOCUMENTS

| | | | | |
|---|---|---|---|---|
| 5,440,143 | A | * | 8/1995 | Carangelo ............ G01N 21/031 250/573 |
| 6,892,565 | B2 | * | 5/2005 | Sato ........................ G01N 29/02 73/23.31 |

(Continued)

FOREIGN PATENT DOCUMENTS

| | | |
|---|---|---|
| CN | 102495003 | 12/2013 |
| CN | 204116223 | 1/2015 |

(Continued)

*Primary Examiner* — Gordon J Stock, Jr.
(74) *Attorney, Agent, or Firm* — Lex IP Meister, PLLC

(57) ABSTRACT

Provided are an optical cavity 100 for a gas sensor which has a space therein and a gas sensor using the optical cavity, in which in the space of the optical cavity 100, an elliptical reflective surface 133, which constitutes a part of an ellipse (133, 133a) and reflects the light emitted from a position of one focal point $F_1$ of the ellipse to concentrate the light on the other focal point $F_2$ of the ellipse, is formed, a hyperbolic reflective surface, which constitutes a part of a hyperbola (135a, 135b) having one focal point that coincides with the other focal point of the ellipse, and reflects the light, which is reflected by the elliptical reflective surface and concentrated on the other focal point of the ellipse, to concentrate the light on the other focal point $f_2$ of the hyperbola, is formed, and a hyperbola centerline B-B', which connects one focal point of the hyperbola and the other focal point of the hyperbola, is inclined toward a side opposite to the elliptical reflective surface by a predetermined angle with respect to an ellipse centerline A-A' which connects one focal point of the ellipse and the other focal point of the ellipse.

5 Claims, 2 Drawing Sheets

(51) Int. Cl.
*G02B 5/10* (2006.01)
*G01N 21/3504* (2014.01)
*G01N 21/03* (2006.01)

(52) U.S. Cl.
CPC ........... *G01N 21/3504* (2013.01); *G02B 5/10* (2013.01); *G01N 2201/0637* (2013.01)

(58) Field of Classification Search
CPC .... G01N 21/59; G01N 21/61; G01N 21/0303; G01N 21/031; G01N 2021/0106; G01N 2021/0112; G01N 2201/068; G01N 2201/117; G01N 2201/0637; G02B 5/10
See application file for complete search history.

(56) References Cited

U.S. PATENT DOCUMENTS

| | | | | |
|---|---|---|---|---|
| 7,501,639 | B2* | 3/2009 | Debroche | G01N 15/1456 |
| | | | | 250/458.1 |
| 7,889,336 | B2* | 2/2011 | Yankov | G01N 21/253 |
| | | | | 356/301 |
| 10,386,298 | B2* | 8/2019 | Barritault | G01N 21/0303 |
| 2007/0114421 | A1* | 5/2007 | Maehlich | G01N 21/0303 |
| | | | | 250/343 |

FOREIGN PATENT DOCUMENTS

| | | |
|---|---|---|
| CN | 204287035 | 4/2015 |
| CN | 206114522 | 4/2017 |
| KR | 100697057 | 3/2007 |
| KR | 101788142 | 10/2017 |

\* cited by examiner

OPTICAL CAVITY FOR GAS SENSOR AND GAS SENSOR HAVING OPTICAL CAVITY

CROSS-REFERENCE TO RELATED APPLICATION

This application claims priority to and the benefit of Korean Patent Application No. 10-2017-0177899 filed in the Korean Intellectual Property Office on Dec. 22, 2017, the entire contents of which are incorporated herein by reference.

BACKGROUND OF THE INVENTION

(a) Field of the Invention

The present invention relates to an optical cavity for a gas sensor and a gas sensor having the optical cavity.

(b) Description of the Related Art

A technology related to a non-dispersive gas sensor has been generally known, and the non-dispersive gas sensor measures concentration of a gas, such as carbon monoxide (CO), carbon dioxide ($CO_2$), or methane ($CH_4$), containing two or more different atoms by using the nature of the gas that absorbs light in a particular wavelength band.

To allow the non-dispersive gas sensor to exhibit excellent detection properties, a length of an optical path needs to be lengthened to increase the amount of light absorption in an optical cavity, and light passing through the optical cavity needs to be concentrated on a photodetector (light detecting sensor).

As a technology for increasing the length of the optical path in the optical cavity, in a non-dispersive gas sensor disclosed in Patent Document 1, a length of an optical path is increased by using an optical cavity manufactured in the form of a sphere by integrating reflective mirrors having five particular curvatures.

A reflective mirror for an optical cavity of a typical non-dispersive gas sensor is manufactured by plastic injection, metal processing, plating, or the like. However, if a curvature of a reflective surface of a reflective mirror cannot satisfy a design value during an actual manufacturing process, a traveling path of the reflected light deviates from a normal range, which may cause a loss. Further, the respective reflective mirrors have aberrations, and as a result, there occurs a problem in that a light traveling path deviates from an expected range as the number of times of reflection is increased. In the case of the gas sensor disclosed in Patent Document 1, the aforementioned problem is more severe because the five reflective mirrors are used to increase the length of the optical path, and as a result, there are problems in that the amount of light inputted to the photodetector is decreased such that measurement precision of the gas sensor deteriorates.

In addition, as a technology for concentrating light, which passes through an optical cavity, on a photodetector (light detecting sensor), Patent Document 2 discloses a gas sensor that includes a Fresnel lens which is installed at a position adjacent to a photodetector and concentrates light passing through the optical cavity to form a focal point, and a parabolic mirror which reflects light, which is dispersed while passing through the Fresnel lens, to collect the light on the photodetector.

However, the technology of Patent Document 2 further requires additional constituent elements, the Fresnel lens and the parabolic mirror, in order to improve light concentration efficiency, and as a result, there are problems in that a configuration of an optical cavity for a gas sensor is complicated, and a size of the optical cavity is also inevitably increased, which leads to an increase in costs.

The above information disclosed in this Background section is only for enhancement of understanding of the background of the invention and therefore it may contain information that does not form the prior art that is already known in this country to a person of ordinary skill in the art.

DOCUMENTS OF RELATED ART

Patent Documents (Patent Document 0001) Korean Patent Application Laid-Open No. 2009-0012952 (published on Feb. 9, 2004)
(Patent Document 0002) Korean Patent Application Laid-Open No. 2011-0057651 (published on Jun. 1, 2011)

SUMMARY OF THE INVENTION

The present invention has been made in an effort to provide an optical cavity for a gas sensor and a gas sensor having the optical cavity, which are capable of increasing the amount of light to be received on a photodetector by increasing a length of an optical path in an optical cavity to the extent possible without an additional constituent element such as a Fresnel lens.

An exemplary embodiment of the present invention provides an optical cavity for a gas sensor which has a space therein, in which in the space of the optical cavity, an elliptical reflective surface, which constitutes a part of an ellipse and reflects the light emitted from one focal point position of the ellipse to concentrate the light on the other focal point of the ellipse, is formed, a hyperbolic reflective surface, which constitutes a part of a hyperbola having one focal point that coincides with the other focal point of the ellipse, and reflects the light, which is reflected by the elliptical reflective surface and concentrated on the other focal point of the ellipse, to concentrate the light on the other focal point of the hyperbola, is formed, and a hyperbola centerline, which connects one focal point of the hyperbola and the other focal point of the hyperbola, is inclined toward a side opposite to the elliptical reflective surface by a predetermined angle with respect to an ellipse centerline which connects one focal point of the ellipse and the other focal point of the ellipse.

Another exemplary embodiment of the present invention provides a gas sensor for measuring gas concentration, including: the optical cavity for the gas sensor; a light source which is disposed at one focal point of the ellipse; and a photodetector which is disposed at the other focal point of the hyperbola, receives the light emitted from the light source, and converts the received light into an electrical signal.

According to the present invention, a length of an optical path, which is a length until light emitted from the light source is concentrated on the photodetector, may be about two times a length in the optical cavity, and as a result, it is possible to ensure the optical path having an appropriate length required to measure gas concentration.

In addition, by the basic properties of the ellipse and the hyperbola, both of the light reflected by the elliptical reflective surface and the light reflected by the hyperbolic reflective surface are concentrated on one point and received by the photodetector without being dispersed in other directions, and as a result, it is possible to minimize a loss of light caused by light dispersion occurring when the light is reflected by the reflective surfaces.

DETAILED DESCRIPTION OF THE EMBODIMENTS

Hereinafter, an optical cavity and a gas sensor using the optical cavity according to an exemplary embodiment of the present invention will be described in detail with respect to the accompanying drawings.

Figure 1:
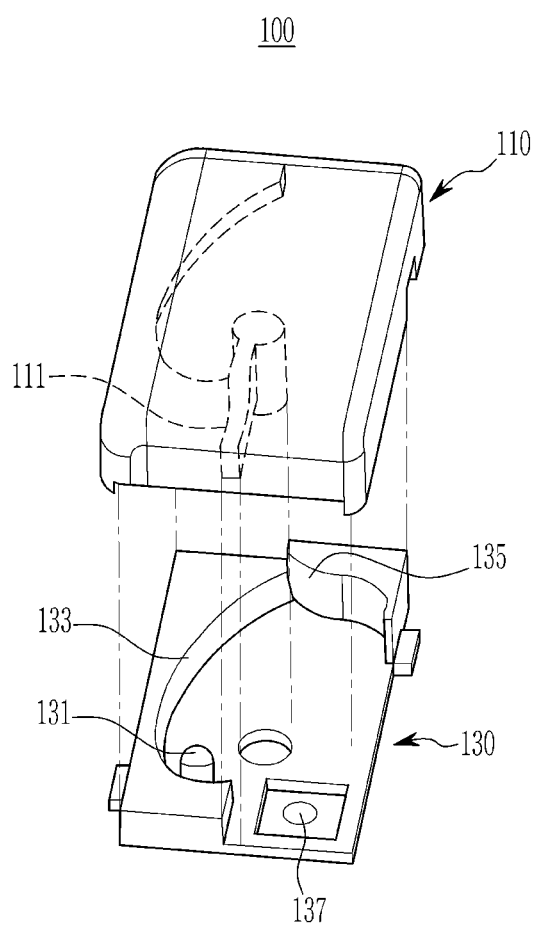
FIG. 1 is an exploded perspective view of an optical cavity according to an exemplary embodiment of the present invention.
Figure 2:
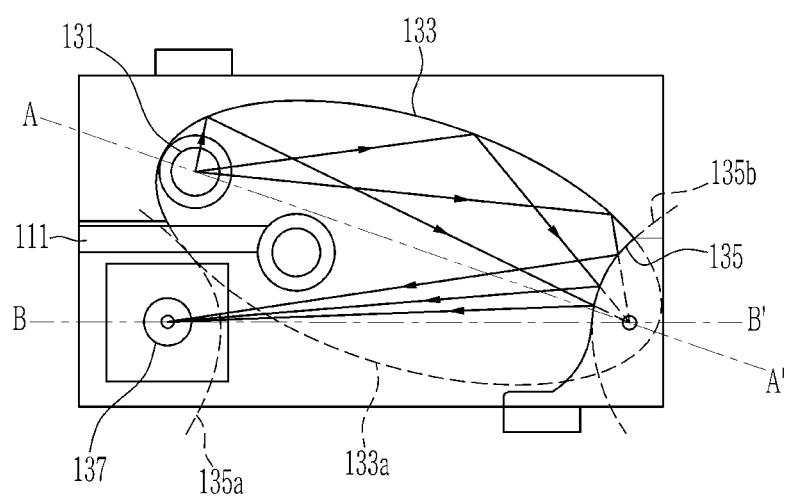
FIG. 2 is a top plan view of the optical cavity according to the exemplary embodiment of the present invention.

FIG. 1 is an exploded perspective view of an optical cavity according to an exemplary embodiment of the present invention, and FIG. 2 is a top plan view of the optical cavity according to the exemplary embodiment of the present invention.

First, an optical cavity for a gas sensor according to the present invention uses natural aspects of an ellipse and a hyperbola. A focal point of at least one ellipse and a focal point of at least one hyperbola are geometrically coincident with each other based on the nature in which "light, which travels toward any one focal point of the two focal points of the ellipse or hyperbola, is reflected by the ellipse or hyperbola and then travels toward the other focal point" and the nature in which "on an elliptical mirror surface, light, which exits any one focal point of the two focal points of the ellipse, is reflected by an elliptical surface and then reaches the other focal point", and then the light, which exits the one focal point of the ellipse, is reflected by a reflective surface and then concentrated on the other focal point of the ellipse, that is, the light, which is concentrated on any one focal point of the two focal points of the hyperbola which are geometrically coincident with the other focal point of the ellipse, is reflected by a hyperbolic surface and then concentrated on the other focal point of the hyperbola, and as a result, the light, which initially exits the one focal point of the ellipse, is concentrated by changing a traveling direction of the light.

Further, the optical path may be further expanded continuously by allowing one focal point of a new hyperbola to coincide with the other focal point of the hyperbola on which the light, which exits the one focal point of the ellipse, is concentrated by changing the traveling direction, and by changing an angle of the new hyperbola to change the traveling direction of the light again.

Therefore, it is possible to continuously increase the length of the optical path by adding a new hyperbola having a focal point coincident with the other focal point of the hyperbola on which the light, which initially exits the one focal point of the ellipse, is concentrated. In addition, the light, which is reflected by the hyperbolic surface, is concentrated on the other focal point of the corresponding hyperbola without being dispersed in other directions, and as a result, it is possible to minimize a loss of light caused by light dispersion even without using a separate light concentration means such as a Fresnel lens.

To this end, as illustrated in FIGS. 1 and 2, an optical cavity 100 according to the exemplary embodiment of the present invention is formed by coupling an upper casing 110 and a lower casing 130 each having a predetermined space therein. The space in the optical cavity 100 is formed by a ceiling surface (not illustrated) which is an inner surface of the upper casing 110, a bottom surface (not illustrated) which is an inner surface of the lower casing 130, and a wall surface which extends along an edge of the bottom surface toward an edge of the ceiling surface by a predetermined height. A part of the wall surface is an elliptical reflective surface 133, as illustrated in FIGS. 1 and 2.

Here, the terms "ceiling surface" and "bottom surface" are made for convenience of description. For example, the inner surface of the lower casing 130 is the bottom surface in a case in which the inner surface of the upper casing 110 is the ceiling surface, and vice versa.

In addition, as illustrated in FIG. 2, an ellipse (133, 133a) is formed by merging the elliptical reflective surface 133, which constitutes a part of the wall surface in the optical cavity 100, with a portion which extends along a shape of the elliptical reflective surface 133 and is indicated by a dotted line 133a in FIG. 2. The elliptical reflective surface 133 extends from a rear side of one focal point $F_1$ of the two focal points $F_1$ and $F_2$ of the ellipse (133, 133a) to the vicinity of the other focal point $F_2$. The elliptical reflective surface 133 surrounds the one focal point $F_1$ at the side of the one focal point $F_1$.

In addition, a light source 131 is disposed at the one focal point $F_1$ of the ellipse (133, 133a), and a light source, which emits incandescent light or infrared light, may be used as the light source 131.

FIG. 2 illustrates the elliptical reflective surface 133 in the form of an ellipse, but actually, as illustrated in FIG. 1, the elliptical reflective surface 133 has a shape made by cutting a part of the ellipse in a major axis direction (in a direction parallel to a central axis A-A' of the ellipse (133, 133a) in FIG. 2). Therefore, the elliptical reflective surface 133 has a predetermined width.

At a side of the other focal point $F_2$ of the ellipse (133, 133a), one focal point $f_1$ of the two focal points $f_1$ and $f_2$ coincides with the other focal point $F_2$ of the ellipse (133, 133a) ($f_1=F_2$), and a central axis B-B', which connects the two focal points $f_1$ and $f_2$, is connected to a hyperbolic reflective surface 135 which is a part of a hyperbola (135a, 135b) disposed to be inclined by a predetermined angle θ with respect to a central axis A-A' of the ellipse 133a.

Here, the hyperbolic reflective surface 135 is formed such that the other focal point $F_2$ of the two focal points $F_1$ and $F_2$ of the ellipse (133, 133a) coincides with the one focal point $f_1$ of the two focal points $f_1$ and $f_2$ of the hyperbola (135a, 135b) ($f_1=F_2$), and as a result, as illustrated in FIG. 2, the hyperbolic reflective surface 135 is of course positioned at a front side of the other focal point $F_2$ of the ellipse (133, 133a) on the central axis A-A' which is an axis connecting the two focal points $F_1$ and $F_2$ of the ellipse (133, 133a) (at a front side of the one focal point $f_1$ of the hyperbola (135a, 135b) on the central axis B-B' which is an axis connecting the two focal points $f_1$ and $f_2$ of the hyperbola (135a, 135b)).

In addition, the hyperbolic reflective surface 135 is a part of the portion 135b of the hyperbola (135a, 135b), 135a indicates an imaginary line, and no surface such as the hyperbolic reflective surface 135 is formed at a side of 135a.

Similar to the elliptical reflective surface 133, the hyperbolic reflective surface 135 is indicated by a line in FIG. 2. However, as illustrated in FIG. 1, the hyperbolic reflective surface 135 is also actually a surface having a predetermined width.

The terms "ellipse" and "hyperbola" are used for convenience of description in the present specification, but actually, the ellipse and the hyperbola are not lines but surfaces each having a predetermined width.

In addition, both of the elliptical reflective surface 133 and the hyperbolic reflective surface 135 are processed as mirror surfaces so as to reflect, at a predetermined angle, the light being incident on the corresponding surface.

In addition, the centerline B-B', which is a line segment connecting the two focal points $f_1$ and $f_2$ of the hyperbola (135a, 135b), is inclined, at a predetermined angle θ toward the wall surface opposite to the wall surface at the side of the elliptical reflective surface 133 in the optical cavity 100, with respect to the centerline A-A' which is a line segment connecting the two focal points $F_1$ and $F_2$ of the ellipse (133, 133a).

Therefore, the other focal point $f_2$ of the hyperbola (135a, 135b) is positioned in the optical cavity 100, at the same side as the one focal point $F_1$ of the ellipse (133, 133a), so as to be spaced apart from the centerline A-A' of the ellipse (133, 133a) by a distance corresponding to the angle θ formed between the centerline A-A' of the ellipse (133, 133a) and the centerline B-B' of the hyperbola (135a, 135b). A photodetector 137, which receives light (optical signal) emitted from the light source 131 and converts the received optical signal into an electrical signal, is disposed at the other focal point $f_2$ of the hyperbola (135a, 135b).

A partition wall 111, which prevents interference between the light emitted from the light source 131 and the light received by the photodetector 137, is formed between the light source 131 disposed at the one focal point $F_1$ of the ellipse (133, 133a) and the photodetector 137 disposed at the other focal point $f_2$ of the hyperbola (135a, 135b).

In addition, although not illustrated in FIGS. 1 and 2, the optical cavity 100 according to the present exemplary embodiment has a gas inlet and a gas outlet which are passageways through which gas, of which the concentration is to be measured, enters and exits the interior of the optical cavity 100.

In addition, the gas sensor according to the exemplary embodiment of the present invention includes an amplifier which amplifies electrical signals from the photodetector 137, and a gas concentration calculation means which calculates gas concentration based on the electrical signal amplified by the amplifier. Because these configurations as well as the light source are made by using publicly known technologies, detailed descriptions thereof will be omitted.

As described above, in the optical cavity 100 according to the present exemplary embodiment, the light source 131 for emitting light and the photodetector 137 for receiving the light emitted from the light source 131 are disposed at an interval at one side in the optical cavity 100, and the light, which is emitted from the light source 131 and then reflected by the elliptical reflective surface 133, is reflected by the hyperbolic reflective surface 135 disposed opposite to the light source 131 and then received by the photodetector 137 disposed opposite to the hyperbolic reflective surface 135, as described below. As a result, the length of the optical path, which is a length until the light emitted from the light source 131 is concentrated on the photodetector 137, is about two times the length in the optical cavity 100. Therefore, it is possible to ensure the optical path having an appropriate length required to measure gas concentration.

In addition, since the light emitted from the light source 131 is reflected by the elliptical reflective surface 133 and the hyperbolic reflective surface 135 and then received by the photodetector 137, the light reflected by the elliptical reflective surface 133 and the light reflected by the hyperbolic reflective surface 135 are concentrated on one point and received by the photodetector 137 without being dispersed in other directions. Therefore, it is possible to minimize a loss of light caused by light dispersion occurring when the light is reflected by the reflective surfaces.

Next, the optical path, which is a path along which the light travels in the optical cavity 100 according to the present exemplary embodiment, will be described with reference to FIG. 2.

The light, which is emitted from the light source 131 disposed at the one focal point $F_1$ of the two focal points $F_1$ and $F_2$ of the ellipse (133, 133a), is reflected by the elliptical reflective surface 133 which is processed as a mirror surface, and then the light travels toward the other focal point $F_2$. The light is reflected by the hyperbolic reflective surface 135 positioned at the front side of the other focal point $F_2$ (the one focal point $F_1$ of the hyperbola (135a, 135b)) while the light travels, and then travels toward the other focal point $f_2$ of the hyperbola (135a, 135b), such that the light is concentrated on the photodetector 137 positioned at the other focal point $f_2$ of the hyperbola (135a, 135b).

While the exemplary embodiment of the present invention has been described above, the present invention is not limited to the exemplary embodiment, and various modifications or alterations may be implemented without departing from the scope of the present invention.

In the exemplary embodiment, the optical path is configured by the single ellipse and the single hyperbola, but the present invention is not limited thereto, and as described above, the length of the optical path may be further expanded by adding a new hyperbola while allowing one focal point of the new hyperbola to coincide with the other focal point $f_2$ of the hyperbola (135a, 135b) on which the light, which exits the one focal point $F_1$ of the ellipse (133, 133a), is concentrated by changing the traveling direction of the light, and simultaneously by changing the traveling direction of the light again by changing an angle of the new hyperbola.

In addition, in the exemplary embodiment, the optical cavity 100 is configured by the two members, the upper casing 110 and the lower casing 130, but the present invention is not limited thereto, and the optical cavity 100 may be configured integrally.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF REFERENCE NUMERALS OF DRAWINGS

100 Optical cavity, 111 Partition wall, 131 Light source, 133 Elliptical reflective surface, 135 Hyperbolic reflective surface, 137 Photodetector

What is claimed is:

1. An optical cavity for a gas sensor which has a space therein, wherein, in the space of the optical cavity,
an elliptical reflective surface, which constitutes a part of an ellipse and reflects the light emitted from one focal point position of the ellipse to concentrate the light on the other focal point of the ellipse, is formed,
a hyperbolic reflective surface, which constitutes a part of a hyperbola having one focal point that coincides with the other focal point of the ellipse, and reflects the light, which is reflected by the elliptical reflective surface and concentrated on the other focal point of the ellipse, to concentrate the light on the other focal point of the hyperbola, is formed, and a hyperbola centerline, which connects one focal point of the hyperbola and the other focal point of the hyperbola, is inclined toward a side opposite to the elliptical reflective surface by a predetermined angle with respect to an ellipse centerline which connects one focal point of the ellipse and the other focal point of the ellipse.

2. The optical cavity of claim 1, wherein:

a partition wall is further formed between the one focal point of the ellipse and the other focal point of the hyperbola.

3. The optical cavity of claim 1, wherein:

a light source for the gas sensor is disposed at the one focal point of the ellipse, and a photodetector, which receives light emitted from the light source and converts the received light into an electrical signal, is disposed at the other focal point of the hyperbola.

4. A gas sensor for measuring gas concentration, comprising:

the optical cavity for the gas sensor according to claim 1;

a light source which is disposed at one focal point of the ellipse; and a photodetector which is disposed at the other focal point of the hyperbola, receives the light emitted from the light source, and converts the received light into an electrical signal.

5. A gas sensor for measuring gas concentration, comprising:

the optical cavity for the gas sensor according to claim 2;

a light source which is disposed at one focal point of the ellipse; and a photodetector which is disposed at the other focal point of the hyperbola, receives the light emitted from the light source, and converts the received light into an electrical signal.

* * * * *